US012366192B2

(12) United States Patent
Jayat

(10) Patent No.: US 12,366,192 B2
(45) Date of Patent: Jul. 22, 2025

(54) DIRECTED SECONDARY AIR SUPPLY INTO THE EXHAUST TRACT OF AN INTERNAL COMBUSTION ENGINE

(71) Applicant: Vitesco Technologies GmbH, Regensburg (DE)

(72) Inventor: Francois Jayat, Wachtberg-Niederbachem (DE)

(73) Assignee: Vitesco Technologies GmbH, Regensburg (DE)

(*) Notice: Subject to any disclaimer, the term of this patent is extended or adjusted under 35 U.S.C. 154(b) by 0 days.

(21) Appl. No.: 18/294,713

(22) PCT Filed: Jul. 19, 2022

(86) PCT No.: PCT/EP2022/070262
§ 371 (c)(1),
(2) Date: Feb. 2, 2024

(87) PCT Pub. No.: WO2023/011915
PCT Pub. Date: Feb. 9, 2023

(65) Prior Publication Data
US 2024/0328339 A1 Oct. 3, 2024

(30) Foreign Application Priority Data
Aug. 3, 2021 (EP) .................................. 21189521

(51) Int. Cl.
F01N 3/30 (2006.01)
F01N 3/20 (2006.01)
F01N 3/34 (2006.01)

(52) U.S. Cl.
CPC .............. F01N 3/30 (2013.01); F01N 3/2026 (2013.01); F01N 3/34 (2013.01); F01N 2340/06 (2013.01)

(58) Field of Classification Search
CPC . F01N 3/2026; F01N 3/30; F01N 3/34; F01N 2340/06
(Continued)

(56) References Cited

U.S. PATENT DOCUMENTS 3,220,805 A 11/1965 Fowler et al.
3,835,645 A * 9/1974 Zoleta ...................... F01N 3/02
60/275

(Continued)

FOREIGN PATENT DOCUMENTS

DE 4340742 6/1995
DE 102016119306 A1 * 4/2018 ................ B01F 3/02
(Continued)

OTHER PUBLICATIONS

European Search Report of corresponding EP Patent Application No. EP 21189521.4.
(Continued)

Primary Examiner — Jorge L Leon, Jr.
(74) Attorney, Agent, or Firm — COZEN O'CONNOR

(57) ABSTRACT

A device for supplying a quantity of secondary air into the exhaust tract of an internal combustion engine, having a flow path which is arranged downstream of the gas outlet of the internal combustion engine in the direction of flow of the exhaust gas, having an injection device which is designed to supply a quantity of secondary air at a supply point into the flow path. The supply of the secondary air takes place upstream of a first honeycomb body), the secondary air being introduced into the flow section through an injection pipe of the injection device, the injection pipe being arranged outside the flow section and opening into the flow section.

8 Claims, 2 Drawing Sheets

(58) Field of Classification Search
USPC .................................. 60/300, 303, 307, 320
See application file for complete search history.

(56) References Cited

U.S. PATENT DOCUMENTS

| | | | | |
|---|---|---|---|---|
| 4,912,920 | A * | 4/1990 | Hirabayashi | F01N 3/032 60/303 |
| 5,376,610 | A * | 12/1994 | Takahata | F01N 3/222 502/65 |
| 5,444,978 | A * | 8/1995 | Yoshizaki | F01N 13/011 60/284 |
| 5,634,331 | A * | 6/1997 | Aoki | F01N 3/0871 60/284 |
| 5,647,203 | A * | 7/1997 | Abe | F01N 3/0835 60/284 |
| 5,814,283 | A * | 9/1998 | Matuoka | F01N 3/2013 422/177 |
| 5,839,273 | A | 11/1998 | Maus | |
| 5,979,157 | A * | 11/1999 | Kinugasa | F01N 3/2026 60/288 |
| 6,052,988 | A * | 4/2000 | Ikeda | F01N 3/2013 219/202 |
| 6,185,931 | B1 * | 2/2001 | Shimasaki | F01N 3/32 60/303 |
| 8,006,487 | B2 * | 8/2011 | Gaiser | F01N 3/2033 60/299 |
| 8,863,505 | B2 * | 10/2014 | Santoso | F01N 3/2006 60/299 |
| 2012/0159937 | A1 * | 6/2012 | Okuda | F01N 3/36 60/303 |
| 2012/0192547 | A1 * | 8/2012 | Mastbergen | F01N 3/025 60/311 |
| 2018/0291784 | A1 * | 10/2018 | Achenback | F01N 3/225 |
| 2019/0383188 | A1 * | 12/2019 | Paukner | F01N 3/2013 |
| 2022/0120202 | A1 * | 4/2022 | Bozalp | F01N 3/101 |

FOREIGN PATENT DOCUMENTS

| | | | | |
|---|---|---|---|---|
| DE | 102017113366 | | 12/2018 | |
| DE | 102019219906 | A1 * | 6/2021 | ............ F01N 11/00 |
| DE | 102021113252 | A1 * | 11/2022 | .......... F01N 3/2006 |
| JP | S-5979023 | A * | 5/1984 | |
| JP | H09503266 | | 3/1997 | |
| JP | 2010248943 | | 11/2010 | |

OTHER PUBLICATIONS

Office Action dated Feb. 7, 2024 issued in European Patent Application No. 21189521.4.
Office Action of corresponding Japanese Patent Application No. 2024-506798, dated, Dec. 27, 2024.

* cited by examiner

DIRECTED SECONDARY AIR SUPPLY INTO THE EXHAUST TRACT OF AN INTERNAL COMBUSTION ENGINE

CROSS REFERENCE TO RELATED APPLICATIONS

This is a U.S. national stage of Application No. PCT/EP2022/070262 filed Jul. 19, 2022. Priority is claimed on European Application No. EP 21189521.4 filed Aug. 3, 2021, the content of which is incorporated herein by reference.

BACKGROUND OF THE INVENTION

1. Field of the Invention

The disclosure relates to a device for supplying a quantity of secondary air into an exhaust tract of an internal combustion engine, having a flow path arranged downstream of a gas outlet of the internal combustion engine in a direction of flow of exhaust gas, having an injection device configured to supply a quantity of secondary air at a supply point into the flow path.

2. Description of the Related Art

Various catalysts are used for the aftertreatment of exhaust gases from internal combustion engines. In particular, catalysts are flow-through bodies that have a particularly large flowthrough surface and a catalytically active coating that promotes the chemical conversion of pollutants contained in the exhaust gas into less harmful products. In the prior art, catalysts are known with a plurality of flow channels through, which flow can occur along a main flow direction. Common catalysts for exhaust gas aftertreatment are formed from ceramic materials or are designed as metallic honeycombs.

What these catalysts have in common is that complete conversion of the respective pollutants only takes place once the catalyst has reached a certain minimum temperature, the so-called light-off temperature. Before the light-off temperature is reached, only an incomplete conversion of the pollutants takes place.

In order to meet the requirements of current and future exhaust gas legislation, it is necessary for this light-off temperature to be reached as quickly as possible. Prior art methods such as secondary air injection are known to achieve faster heating. In this process, additional air is injected into the exhaust port of the internal combustion engine, whereby the internal combustion engine is driven with an increased proportion of fuel to increase the fuel content of the exhaust gas blown into the exhaust port. As a result, an exothermic reaction occurs in the exhaust tract, which leads to heating of the catalysts.

The above-described injection of secondary air into the exhaust tract can also be carried out if an electrically heated catalytic converter is provided in the exhaust tract. This corresponds to another method of reducing the occurrence of pollutant emissions. An electrically heated catalytic converter only causes pollutant conversion when its start-up temperature (light off temperature) is reached, which is 300° C., for example.

If the electrically heated catalytic converter is energized before the internal combustion engine is activated, preheating takes place. A heating disk of the catalyst is heated by utilizing the electrical resistance. As the engine is not running, no exhaust gas will be delivered into the exhaust tract, therefore the heat from the electrically heated catalytic converter will be transported by the secondary air flow via convection to the following catalytic converters, e.g. the support catalyst of the heat disc.

A particular disadvantage of the prior art devices is that the injection of secondary air is nondirectional. The secondary air flow in the exhaust line between the point at which the secondary air is supplied and the first honeycomb is regularly non-uniform. This means that there is no optimum heating and, in extreme cases, local overheating of the honeycomb body can occur. This effect is particularly harmful if the first honeycomb body is formed by an electrically heatable heating disc.

SUMMARY OF THE INVENTION

One aspect of the present invention is a device that allows a directed supply of secondary air into the exhaust tract of an internal combustion engine. In particular, a homogeneous distribution of the secondary air flow directly in front of and at the first honeycomb body is to be achieved.

One aspect of the invention relates to a device for supplying a quantity of secondary air into the exhaust tract of an internal combustion engine, having a flow path arranged downstream of the gas outlet of the internal combustion engine in the direction of flow of the exhaust gas, having an injection device, which is designed to supply a quantity of secondary air at a supply point into the flow path, whereby the supply of the secondary air takes place upstream of a first honeycomb body, the secondary air being introduced into the flow section through an injection pipe of the injection device, the injection pipe being arranged outside the flow section and opening into the flow section.

The supply of the exhaust gas through an injection pipe is particularly advantageous, since the supply of secondary air can be precisely controlled by a precisely defined opening of the injection pipe and a precisely defined position within the exhaust tract. Within the injection pipe, the flow of secondary air can be preconditioned so that the secondary air flowing into the exhaust tract exactly matches the respective conditions in the exhaust tract. This applies, for example, to the flow velocity, the flow direction and the uniform distribution of the secondary air across the cross section through which it flows.

The arrangement of the injection pipe outside the exhaust gas flow path does not adversely affect the flow of exhaust gas within it. The exhaust gas can continue to flow freely and no unnecessary backpressure is generated.

It is particularly advantageous if the feed point at which the secondary air is fed into the flow section is located downstream of an exhaust gas turbocharger.

This is advantageous in order to make the heat transfer from the electrically heatable catalytic converter to the following catalysts, e.g. the support catalyst of the heat disc, easier and faster.

It is also advantageous if the first honeycomb body is formed by an electrically heatable honeycomb body.

An electrically heatable honeycomb body is advantageous in order to achieve the fastest possible heating and thus reach the light-off temperature of the individual catalysts as quickly as possible. The secondary air can lead to a strongly exothermic reaction at the electrically heatable honeycomb body, in particular with an exhaust gas that has a high proportion of unused hydrocarbons, which increases the heating effect. Also, the secondary air can be taken out of a gas tank or a filter that is used to filter free floating hydrocarbons out of a gas tank to make sure that the secondary air flow has an increased proportion of unburned hydrocarbons in it. This is especially advantageous, if the engine is started in the cold, especially at temperatures below the freezing point, where the engine is operated with a fat fuel mixture. The use of secondary air with unburned hydrocarbons can ensure that the subsequent catalysts can be operated stoichiometrically.

According to one aspect, the injection tube has a cylindrical cross-section.

A cylindrical cross-sectional area is particularly advantageous for generating the most homogeneous flow possible. This applies in particular because the downstream flow paths in the exhaust tract regularly also have a cylindrical cross-sectional area.

It is also preferable if the injection tube has a cross-section which widens conically towards the feed point.

The conical widening forms a diffuser, which can promote a homogeneous flow dispersion of the secondary air.

Furthermore, it is advantageous if the injection tube has a metallic substrate with a plurality of flow channels through which the flow can pass along a main flow direction towards the feed point.

The metallic substrate in the injection tube can be formed by a honeycomb body through which flow can pass along several flow channels. Preferably, such a honeycomb body has a diameter of 30 mm to 40 mm and an axial length in the flow direction of 25 mm to 30 mm. The cell density of the honeycomb body is preferably 50 cpsi (cells per square inch) to 100 cpsi. The film thickness of the metal foils used for the honeycomb body and the wall thickness of the honeycomb body are preferably between 50 μm and 65 μm.

Furthermore, it is advantageous if the injection tube comprises an element for generating a swirl in the secondary air flow.

The generation of a swirling flow is particularly advantageous if one wishes to achieve the most homogeneous distribution possible of the secondary air quantity and the flow velocity of the secondary air across the cross-section of the injection pipe and/or the flow path of the exhaust gas.

It is also advantageous if the element for generating a swirl is formed by a plate with openings arranged in the injection tube, the flow through the openings taking place along preformed wing elements.

Swirl in a gas flow can also be generated in different ways. Preferably, a swirl plate is used which has a plurality of openings through which the flow can pass. The flow-through openings have guide elements that contribute to a directional deflection of the flow. These can for instance be guide surfaces of all kinds.

Furthermore, it is advantageous if the flow of secondary air in the injection tube is cyclone-like due to the element for generating a swirl.

Such flow propagation is particularly advantageous in order to achieve the most homogeneous flow possible across the entire flow cross-section.

Furthermore, it is expedient if the injection tube is supplied with a secondary air flow via an air supply section, the injection tube being arranged centrally in a chamber, it being possible for the secondary air to flow around the injection tube within the chamber and for the secondary air to overflow from the chamber into an inlet opening of the injection tube.

The chamber can be used to precondition the secondary air flow. In particular, a uniformity of the secondary air flow can be achieved and the flow can be given a preferred direction vector. The chamber is located upstream of the injection tube in the direction of flow and is thus traversed by the secondary air before it flows through the injection tube or into the flow section.

The chamber can advantageously have further elements for influencing the secondary air flow, in particular fins, guide vanes or special surface coatings. In addition, the volume and the respective shape of the chamber can be varied depending on the specific application in each case.

Advantageous further aspects of the present invention are described in the following figure description.

BRIEF DESCRIPTION OF THE DRAWINGS

In the following, the invention is explained in detail by examples with reference to the drawings. The drawings show.

DETAILED DESCRIPTION OF THE PRESENTLY PREFERRED EMBODIMENTS

Figure 1:
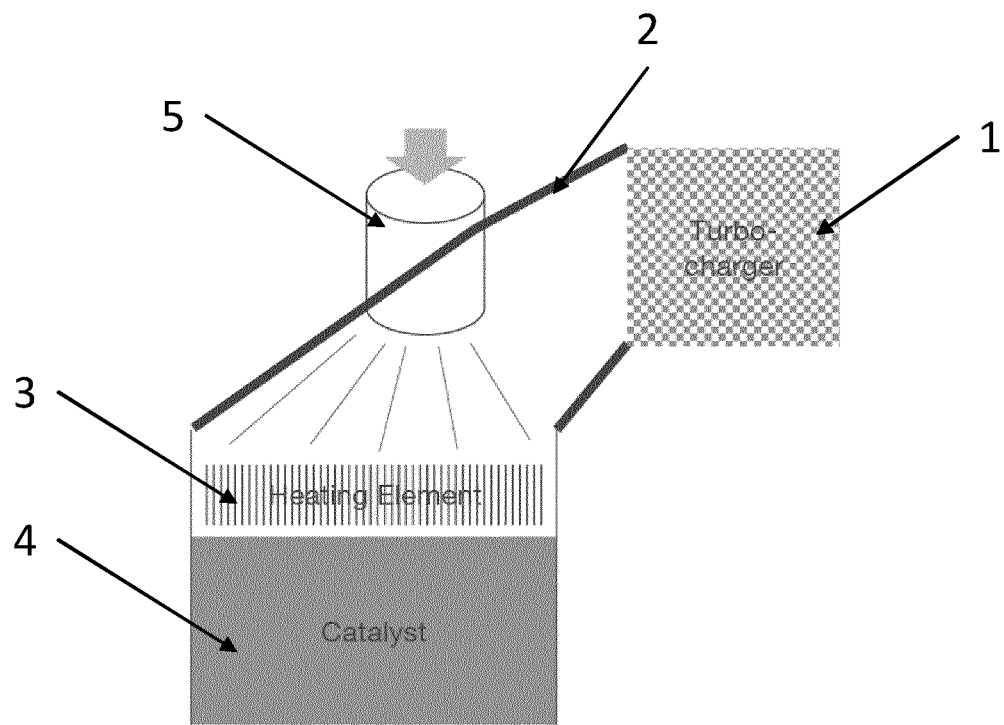
FIG. 1 is a schematic view of an exhaust tract from an exhaust gas turbocharger to an electrically heatable catalytic converter, wherein secondary air is supplied to the exhaust line.

FIG. 1 shows an exhaust gas turbocharger 1 and an exhaust gas tract 2 downstream of it, which leads the exhaust gas from the exhaust gas turbocharger 1 to an electrically heatable catalytic converter 3.

The electrically heatable catalytic converter 3 consists of an electrically heatable honeycomb body that can be connected to a voltage source via electrical feedthroughs not shown in this figure. Downstream of the electrically heatable catalytic converter 3 is a further catalytic converter 4, on which the electrically heatable catalytic converter 3 can be supported by support pins.

The exhaust gas tract 2 has a feed point at which an injection pipe 5 opens into the exhaust gas tract 2. A secondary air stream can be fed into the exhaust gas tract 2 via the injection pipe 5. For this purpose, the injection pipe 5 can have elements for directing the flow, such as nozzle elements, vanes or fins, which generate a directed flow of secondary air in the exhaust gas tract 2.

Figure 2:
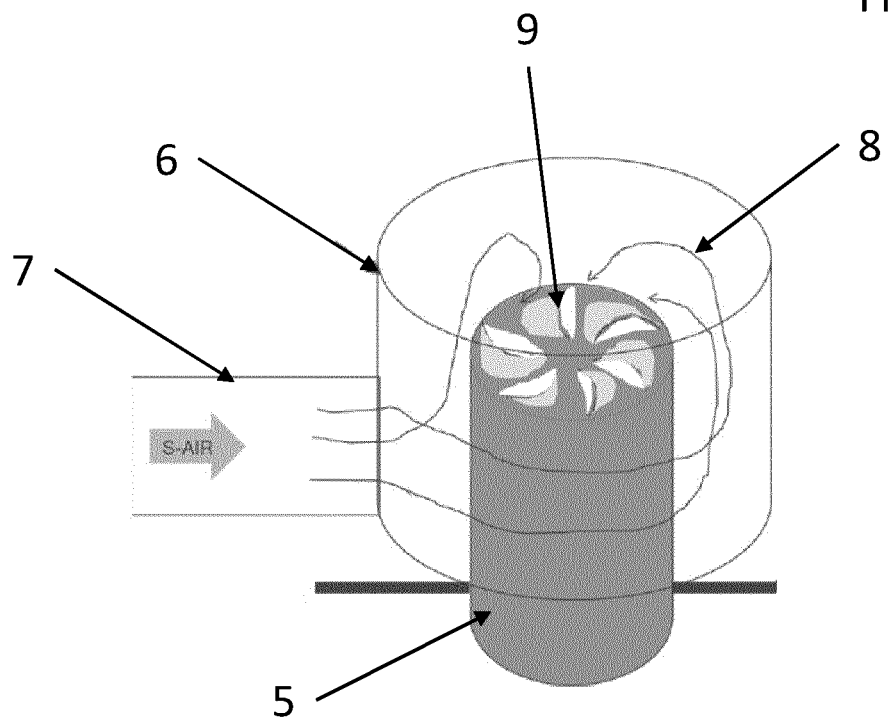
FIG. 2 is a view of a chamber for feeding secondary air into the injection tube.

FIG. 2 shows an injection pipe 5 as already indicated in FIG. 1. The injection pipe 5 is arranged in a chamber 6, which can be supplied with secondary air through a duct 7. The possible flow of secondary air is indicated by the flow lines 8.

The chamber 6 represents a closed housing, which is designed to direct the secondary air flowing in via the duct 7 as evenly as possible into the injection pipe 5. Conducting elements can be provided in the chamber 6 for this purpose. In addition, the chamber 6 can also have a different shape from the cylindrical shape shown here in order to transfer the flow from the duct 7 into the injection pipe 5 in the best possible direction and evenly distributed. In particular, changes in the flow cross-section within the chamber 6 can be provided, as well as recesses and elevations in the wall of the chamber 6, which serve to guide the flow.

The injection pipe 5 of FIG. 2 has air guide elements 9 on its inflow side. These air guide elements 9 are formed by vanes and serve to direct the secondary air flowing into the injection pipe 5 and to create an improved uniform distribution of the secondary air in the injection pipe 5.

Figure 3:
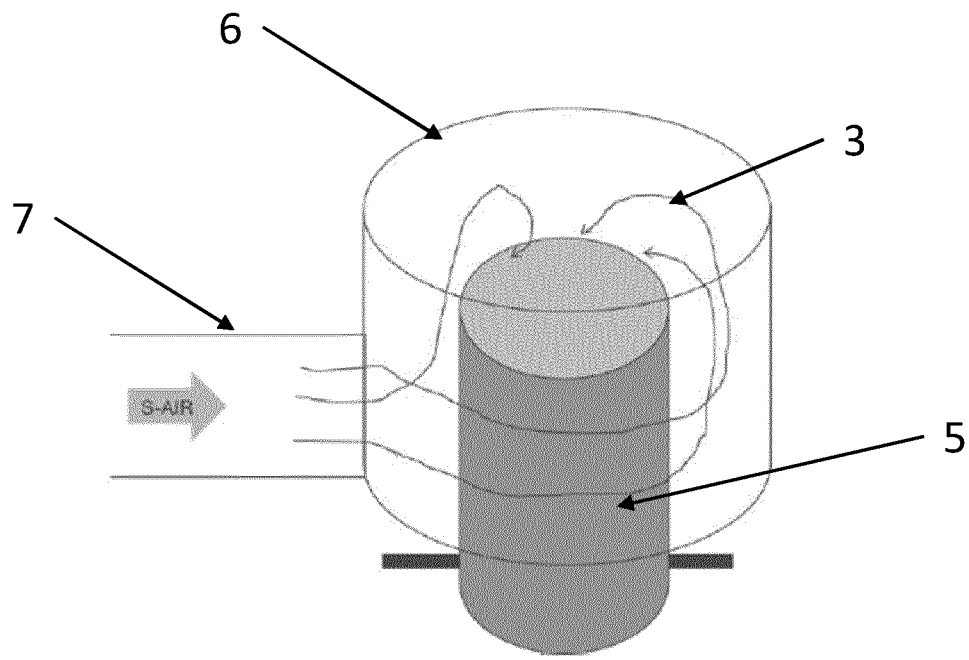
FIG. 3 is a view of a chamber for supplying secondary air into the injection tube, wherein a metallic honeycomb is disposed in the injection tube.

FIG. 3 shows an aspect similar to that of FIG. 2. In contrast to FIG. 2, a metallic honeycomb body 10 is inserted into the injection tube 5, which has a plurality of flow channels running from the inflow side facing the chamber 6 to the outflow side forming the feed point into the exhaust gas line.

In an alternative aspect, the honeycomb body may also be formed from a ceramic material. By adapting the structure of the honeycomb body, different properties can be formed. In particular, the cell density, the wall thickness, the length and the diameter can be adapted. In addition, guide elements can be provided in the flow channels of the honeycomb body, or openings can be made to allow selective overflow between several flow channels.

Figure 4:
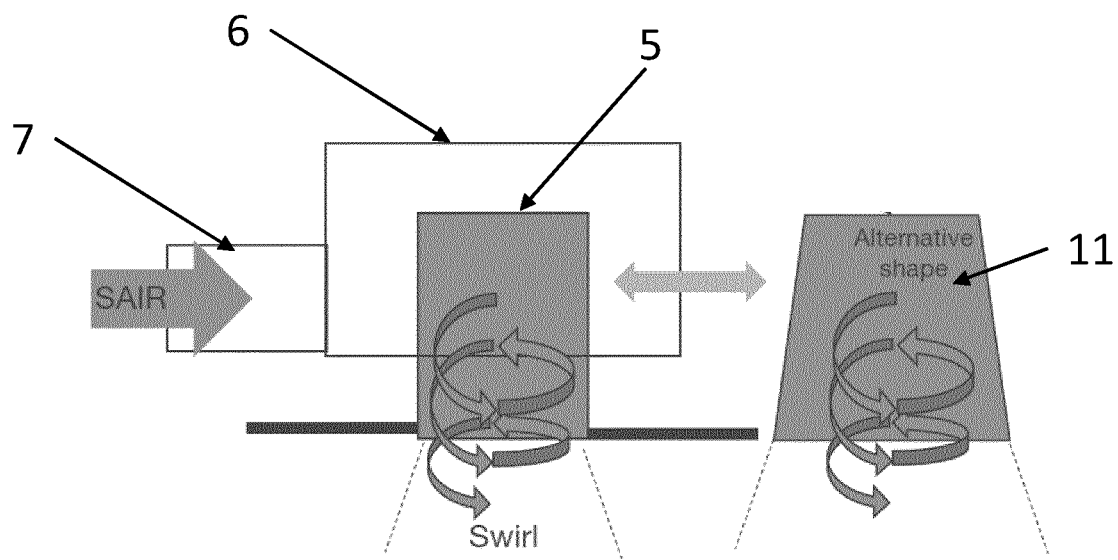
FIG. 4 is a sectional view through a chamber for supplying secondary air, showing a cylindrical injection tube on the left side and a conically expanding injection tube on the right side.

The left part of FIG. 4 shows an injection pipe 5, which has a cylindrical shape. The righthand part of the figure shows an injection pipe 11 which widens conically from the inflow side to the outflow side. The injection pipe 11 on the right hand side is an alternative embodiment for the injection pipe 5 on the left hand side.

In both injection pipes 5, 11 a cyclone-like flow guidance of the secondary air flowing through the injection pipe 5, 11 is shown. Depending on the design of the injection pipe 5, 11, a differently spreading secondary air flow can be achieved.

The different features of the examples can also be combined with each other.

In particular, the embodiments of FIGS. 1 to 4 are not of a limiting character and serve to illustrate the idea of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for supplying a quantity of secondary air into an exhaust gas of an internal combustion engine, comprising:
   an exhaust tract arranged downstream of a gas outlet of the engine so as to convey the exhaust gas; and
   an injection device including an injection pipe which supplies the quantity of secondary air into the exhaust gas at a supply point of the exhaust tract which is upstream of a first honeycomb body, the injection pipe including an inlet opening and an outlet opening,
   wherein the injection pipe is arranged outside the exhaust tract such that the outlet opening connects directly to the exhaust tract so as to introduce the secondary air, and
   wherein an inner diameter of the injection pipe widens conically over an entire extent of the injection pipe from the inlet opening to the outlet opening at the supply point.

2. The device according to claim 1, wherein the supply point is downstream of an exhaust gas turbocharger.

3. The device according to claim 1, wherein the first honeycomb body is an electrically heated honeycomb body.

4. The device according to claim 1, wherein the injection pipe has further includes a metallic substrate with a plurality of flow channels configured to convey the secondary air towards the supply point.

5. The device according to claim 1, wherein the injection pipe further includes a swirler that generates a swirl in a flow of the secondary air.

6. The device according to claim 5, wherein the swirler includes a plate with openings arranged in the injection pipe, and
   wherein the flow of the secondary air passes through the openings via preformed wing elements.

7. The device according to claim 5, wherein the swirl is cyclone-like due to the swirler.

8. The device according to claim 1, wherein the injection pipe receives the secondary air from an air supply section including a chamber such that the secondary air flows around the injection pipe within the chamber and overflows from the chamber into the inlet opening of the injection pipe.

* * * * *